(12) United States Patent
Haag et al.

(10) Patent No.: US 12,510,665 B2
(45) Date of Patent: Dec. 30, 2025

(54) ULTRASONIC SENSOR FOR A MOTOR VEHICLE, AND MOTOR VEHICLE

(71) Applicant: Valeo Schalter und Sensoren GmbH, Bietigheim-Bissingen (DE)

(72) Inventors: Fabian Haag, Bietigheim-Bissingen (DE); Hans Wilhelm Wehling, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 140 days.

(21) Appl. No.: 18/265,824

(22) PCT Filed: Nov. 29, 2021

(86) PCT No.: PCT/EP2021/083285
§ 371 (c)(1),
(2) Date: Jun. 7, 2023

(87) PCT Pub. No.: WO2022/122435
PCT Pub. Date: Jun. 16, 2022

(65) Prior Publication Data
US 2024/0053471 A1 Feb. 15, 2024

(30) Foreign Application Priority Data
Dec. 8, 2020 (DE) .................. 10 2020 132 631.9

(51) Int. Cl.
*G01S 15/931* (2020.01)
*G01K 11/00* (2006.01)
(Continued)

(52) U.S. Cl.
CPC ............ *G01S 15/931* (2013.01); *G01S 7/521* (2013.01); *G10K 11/002* (2013.01); *G01S 2015/932* (2013.01)

(58) Field of Classification Search
CPC ...... G10K 9/22; G10K 11/002; G01S 15/931; G01S 7/521; G01S 2015/932
See application file for complete search history.

(56) References Cited

U.S. PATENT DOCUMENTS 8,973,442 B2 * 3/2015 Schneider ............ G10K 11/004
73/632
9,087,504 B2 * 7/2015 Mueller ............ G01N 29/2437
(Continued)

FOREIGN PATENT DOCUMENTS

CN 101384101 A 3/2009
CN 101473369 A 7/2009
(Continued)

OTHER PUBLICATIONS

Office Action issued in counterpart Japanese Patent Application No. 2023-534702 mailed Mar. 1, 2024 (12 pages).
(Continued)

*Primary Examiner* — Daniel L Murphy
*Assistant Examiner* — Amie M Ndure
(74) *Attorney, Agent, or Firm* — Osha Bergman Watanabe & Burton LLP (57) ABSTRACT

The invention relates to an ultrasonic sensor (1) having an improved structural dynamic for a motor vehicle (20). The ultrasonic sensor (1) comprises: a plastic housing (2), a membrane assembly (3) arranged in a housing opening (4) of the plastic housing (2), the membrane assembly having an ultrasonic membrane (8), and a decoupling element (6) which is arranged between an inner surface (5) of the plastic housing (2) and the membrane assembly (3). A plurality of ribs (7, 71, 72) are formed at the inner surface (5) of the plastic housing (2), on which the decoupling element (6) rests against, and the ribs (7, 71, 72) are designed in such a (Continued)

way that the decoupling element (6) does not rest against the entire inner surface (5) of the plastic housing (2).

14 Claims, 7 Drawing Sheets

(51) Int. Cl.
    *G01S 7/521*     (2006.01)
    *G10K 11/00*     (2006.01)

(56) References Cited

U.S. PATENT DOCUMENTS

| | | | | |
|---|---|---|---|---|
| 2003/0060714 | A1* | 3/2003 | Henderson | A61B 8/00 600/459 |
| 2011/0077553 | A1* | 3/2011 | Alroy | A61B 5/150786 600/573 |
| 2015/0008796 | A1 | 1/2015 | Sun | |
| 2015/0212203 | A1 | 7/2015 | Kupfernagel | |
| 2016/0008796 | A1 | 1/2016 | Saka | |
| 2016/0329037 | A1 | 11/2016 | Wehling et al. | |
| 2019/0277954 | A1* | 9/2019 | Bayarsaikhan | G10K 9/122 |
| 2020/0056709 | A1* | 2/2020 | Loprete | F16K 7/04 |

FOREIGN PATENT DOCUMENTS

| | | | |
|---|---|---|---|
| CN | 202351425 U | 7/2012 | |
| CN | 203433112 U | 2/2014 | |
| CN | 111133502 A | 5/2020 | |
| CN | 118202403 A * | 6/2024 | G01S 15/931 |
| DE | 19937195 A1 | 2/2001 | |
| DE | 102006028214 A1 | 12/2007 | |
| DE | 102012200639 A1 | 7/2013 | |
| DE | 102013022048 A1 | 6/2015 | |
| DE | 10 2014 200 056 A1 | 7/2015 | |
| DE | 102014114639 A1 * | 4/2016 | B60K 11/085 |
| DE | 102016221535 A1 * | 5/2018 | G01S 15/931 |
| DE | 202014011304 U1 * | 4/2019 | B60R 19/48 |
| DE | 102018100121 A1 | 7/2019 | |
| EP | 1710785 A2 | 10/2006 | |
| EP | 2805321 B1 | 2/2016 | |
| JP | 2007-139570 A | 6/2007 | |
| JP | 2020-535710 A | 12/2020 | |

OTHER PUBLICATIONS

International Search Report and Written Opinion in corresponding International Application No. PCT/EP2021/083285, dated Feb. 14, 2022 (12 pages).

Kti Gmbh. "Sensoren für FAS" Aug. 30, 2018 (Aug. 30, 2018), Retrieved from the Internet: https://www.k-t-i.de/fileadmin/user_upload/pdfs/publikationen/ti/201/2018-08_TI_Sensoren_fu%CC%88r_FAS_V1.0.pdf, [retrieved on Feb. 4, 2022] XP055887732 (18 pages).

German Search Report in corresponding German Application No. 10 2020 132 631.9, dated Sep. 22, 2021 (5 pages).

Notice of Preliminary Rejection in corresponding Korean Application No. 10-2023-7019210, dated Mar. 21, 2025 (18 pages).

Office Action in corresponding Chinese Application No. 202180082439.1, dated Jul. 23, 2025 (18 pages).

* cited by examiner

FIG. 7

ULTRASONIC SENSOR FOR A MOTOR VEHICLE, AND MOTOR VEHICLE

The present invention relates to the field of ultrasonic sensors for motor vehicles and more specifically to an ultrasonic sensor for a motor vehicle and to a motor vehicle.

Ultrasonic sensors with a housing and an ultrasonic membrane arranged in a housing opening of the plastics housing are known, for example from DE 10 202 200 639 A1. An ultrasonic sensor of that type can be used to measure a distance from an object in the motor vehicle vicinity or from an object in the interior of the vehicle using the pulse-echo method. The ultrasonic membrane emits, excited by a sound transducer element attached thereto, energy in the form of an ultrasonic signal. The sound transducer element then detects vibrations in the ultrasonic membrane which originate from an echo signal returning from the motor vehicle vicinity or the interior. The distance from the object is determined based on the signal time of flight. Such measurements are used, for example, by a parking assistance system of the motor vehicle.

After the ultrasonic signal has been emitted, structural vibrations of the ultrasonic sensor that are excited when the ultrasonic signal is emitted must first decay. During the decay time, the ultrasonic sensor is blind and cannot detect an echo signal.

It is therefore desirable to improve the structural dynamics of an ultrasonic sensor. In particular, transfer paths to structural elements that are able to store energy efficiently, such as the plastics housing and in particular the metallic contact elements arranged therein, should be eliminated as far as possible. This is conventionally achieved, for example, by arranging a decoupling element, such as a silicone ring, between the ultrasonic membrane and the plastics housing.

In DE 19 212 299 639 A1, ribs are arranged on the decoupling ring in a contact region between the decoupling ring and the ultrasonic membrane pot or the plastics housing in order to reduce the rigidity of the decoupling ring.

DE 10 2013 022 048 A1 also teaches such an ultrasonic sensor with a decoupling ring structured by ribs.

DE 10 2106 2321 535 A1 teaches an ultrasonic transducer with a housing and a membrane pot. The membrane pot is accommodated in a receiving region of the housing. On a radially circumferential axial stop surface arranged perpendicular to the longitudinal axis, the receiving region has a plurality of elevations, which are likewise arranged radially circumferentially and the function of which is not disclosed. The receiving region encompasses the membrane pot with the flush interposition of an elastic decoupling ring.

US 2016/0008796 A1 teaches that, in the case of an ultrasonic transducer, a preferably elastic fixing element couples a membrane pot, referred to as a "case," to the housing. The elastic fixing element has circumferential ribs on an outer circumference, which engage in depressions in a plastics element which are designed to correspond to the ribs.

Against this background, the object of the present invention is to provide an ultrasonic sensor with improved structural dynamics.

According to a first aspect, an ultrasonic sensor for a motor vehicle is proposed, wherein the ultrasonic sensor has: a plastics housing, a membrane assembly which is arranged in a housing opening of the plastics housing and comprises an ultrasonic membrane, and a decoupling element which is arranged between an inner surface of the plastics housing and the membrane assembly, wherein a plurality of ribs against which the decoupling element rests are formed on the inner surface of the plastics housing, and the ribs are formed such that the decoupling element does not rest fully against the inner surface of the plastics housing.

In particular, the decoupling element does not rest fully against the inner surface of the plastics housing in a region in which the ribs are formed.

In particular, the decoupling region does not rest, or does not rest fully, against the inner surface of the plastics housing between in each case two adjacent ribs.

With particular preference, the decoupling element rests only against tips of the ribs in the region in which the ribs are formed.

Accordingly, a proportion of the inner surface of the plastics housing that is in contact with the decoupling element (hereinafter also referred to as the "bearing proportion" of the inner surface) is advantageously lower than in comparative examples in which no ribs are provided on the inner surface of the plastics housing and/or in which, despite ribs being provided on the inner surface of the plastics housing, the decoupling element also rests against the inner surface of the plastics housing between the ribs, for example because it is pressed into the spaces between the ribs and/or has a shape complementary to the ribs.

The decoupling element is in particular made of a soft material that is at least softer than the plastics housing and softer than a material of the membrane assembly. The membrane assembly is made of aluminum, for example. The decoupling element can be made of silicone, for example. Accordingly, plastic and aluminum can also be referred to as "hard" materials.

Due to the structural vibrations of the membrane assembly, the proposed reduction in the bearing proportion can alternately cause increased compression of the soft decoupling element and increased relaxation of the preferably preloaded connection between the soft decoupling element and the hard plastics housing. This reduces the energy transfer from the ultrasonic membrane via the decoupling element to the plastics housing. Acoustic decoupling can thus advantageously be provided at an interface between the decoupling element and the plastics housing.

The ribs are formed on the inner surface of the hard plastics housing and not on the soft decoupling element. The ribs are thus formed on the harder or stronger component. Accordingly, the decoupling element is hardly deformed even if mounting takes place under preloading, and the bearing proportion also continues to be reduced after mounting.

In particular, the inner surface of the plastics housing is a surface that defines an edge surface of the housing opening.

The decoupling element is arranged between the inner surface of the plastics housing and the membrane assembly in particular in such a way that the membrane assembly and the plastics housing do not touch one another directly anywhere. In other words, the decoupling element is arranged in particular in an entire region in which the membrane assembly and the inner surface of the plastics housing overlap.

Silicone as the material for the decoupling element is also advantageous in that its behavior hardly changes over the range of operating temperatures that is typical for the motor vehicle sector.

In addition to the ultrasonic membrane, the membrane assembly can detect further components of the ultrasonic sensor which are allowed to vibrate together with the membrane because this is either technically necessary or because these components have a low or negligible inherent weight. In contrast, all other components of the ultrasonic sensor are arranged in particular in the plastics housing and are therefore acoustically decoupled from the membrane assembly.

In particular, the membrane assembly can comprise a sound transducer element, such as a piezo element or the like, for exciting vibrations and detecting vibrations of the ultrasonic membrane. The sound transducer element can be glued to an inner side of the ultrasonic membrane or fixed to it in some other way. The membrane assembly can further comprise a jacket-type side wall against which the decoupling element can rest. In this case, at least one section of the jacket wall can be arranged in the housing opening of the plastics housing, wherein the decoupling element is arranged between the housing opening and the section of the jacket wall, and another section of the jacket wall and the ultrasonic membrane can protrude from the plastics housing.

"Arranged in a housing opening of the plastics housing" can therefore be understood to mean that at least one section of the membrane assembly is arranged within the housing opening of the plastics housing.

According to one embodiment, the decoupling element lies flat against the membrane assembly.

In particular, the decoupling element rests fully against the membrane assembly and/or is flush with it. In other words, no ribs are formed on the membrane assembly, and a proportion of an outer surface of the membrane assembly that is in contact with the decoupling element of the membrane assembly is not reduced.

Accordingly, there is a damping effect in addition to the acoustic decoupling, since vibrational energy of the membrane assembly can be dissipated in the decoupling element by internal friction if the interface between the decoupling element and the membrane assembly is designed to be flush or in full surface contact without ribs. In addition, it becomes easier to fix the membrane assembly in the attached decoupling element in the plastics housing.

According to a further embodiment, the membrane assembly is mounted under preloading in the housing opening.

In particular, the membrane assembly and the decoupling element can be mounted together in the housing opening under preloading.

Accordingly, advantageously no fixation means, which could represent a "leak" for vibrational energy, are required for fixing the membrane assembly to the plastics housing.

According to a further embodiment, the membrane assembly comprises a membrane pot with a base forming the ultrasonic membrane, and a jacket formed in one piece with the base, wherein the membrane pot is inserted into the housing opening along an axial direction of the housing opening.

The membrane pot can in particular be a deep-drawn component made in one piece of aluminum. A "one-piece" formation is to be understood, in particular, to mean primary shaping in a single operation.

"Inserted into the housing opening" is to be understood to mean in particular that at least one section of the membrane pot (specifically a section of the jacket) is inserted into the housing opening. In particular, the membrane pot is partially inserted into the housing opening and partially protrudes from the housing opening, wherein the base of the membrane pot points axially to the outside and is not inserted into the housing opening.

Here, in particular, the axial direction of the housing opening can coincide with an axial direction of the membrane pot. Furthermore, in a section in which the jacket of the membrane pot is inserted into the housing opening, an outer circumference of the jacket of the membrane pot can match or substantially match a circumference of the housing opening in such a way that a gap remains, in which the decoupling element is located in the housing opening between the outer circumference of the jacket and the inner surface of the plastics housing.

The jacket of the membrane pot, the housing opening into which the membrane pot is inserted, and the base of the membrane pot, which is arranged outside the plastics housing, can each have a substantially round, oval or elliptical cross section, for example. A cross section that is not completely round can bring about an anisotropy of the radiation pattern of the ultrasonic membrane that is advantageous for measuring the vicinity.

The jacket of the membrane pot protects the ultrasonic sensor from the ingress of water and foreign bodies in the section where it is not inserted into the housing opening. In the section in which the jacket is inserted into the housing opening, a flush and tight seal can be achieved by the decoupling element that rests in particular fully against the jacket.

According to a further embodiment, at least some of the ribs on a jacket section of the inner surface of the plastics housing project radially inward and extend in the axial direction of the housing opening.

Accordingly, radial structural vibrations of the membrane pot can advantageously be acoustically decoupled from the plastics housing. Since the ribs on the jacket section of the inner surface extend in a radial direction, it is additionally easier to insert the membrane pot and the decoupling element into the housing opening of the plastics housing along the inner surface of the plastics housing at the time of mounting. This applies in particular if the membrane pot is mounted in the housing opening under a defined preload.

It should be noted that the housing opening can be substantially cylindrical, and the jacket section of the inner surface of the plastics housing can accordingly define a jacket-type edge surface of the housing opening.

According to a further embodiment, the ribs extending in the axial direction form an insertion bevel for inserting the membrane pot and the decoupling element.

That is to say, an amount by which the axially extending ribs project radially into the housing opening may gradually increase along the axial extent of those ribs from the outside to the inside. In other words, the ribs can define a larger free diameter of the housing opening at an axially outward position than at an axially inward position.

Accordingly, the insertion of the membrane pot and of the decoupling element is simplified at the time of mounting. In particular, preloading of the mounting can gradually increase to the extent to which the membrane pot and the decoupling element are inserted into the housing opening.

According to a further embodiment, at least one section of the decoupling element is arranged in an entire first overlap region in which an outer surface of the jacket of the membrane pot and the jacket section of the inner surface of the plastics housing overlap, lies flat against the jacket of the membrane pot, and annularly encloses the jacket of the membrane pot, wherein the ribs extending in the axial direction are formed in the jacket section of the inner surface of the plastics housing in the first overlap region.

Accordingly, in the entire first overlap region, in which the membrane pot (the outer surface of the jacket) and the jacket section of the inner surface of the plastics housing radially overlap, the decoupling element can be arranged between the two. In this case, the proposed acoustic decoupling is provided in that the axially extending ribs are provided in the first overlap region and a bearing proportion of the jacket section of the inner surface of the plastics housing is reduced. In addition, the decoupling element can have a damping effect on account of the decoupling element resting flat, in particular fully, against the jacket of the membrane pot.

According to a further embodiment, at least some of the ribs protrude at a base section of the housing opening in the axial direction of the housing opening and extend annularly in a circumferential direction of the housing opening.

Accordingly, axial structural vibrations of the membrane pot can advantageously be acoustically decoupled from the plastics housing. Since the ribs extend annularly in the circumferential direction of the housing direction, that is to say in particular around the entire circumference of the housing opening, a sealing effect can be achieved.

It should be noted that the inner surface of the plastics housing can also have, in addition to the jacket section, a base section which defines at least sections of an edge surface at the base section of the housing opening. Accordingly, the ribs protruding in the axial direction are also ribs formed on the inner surface of the plastics housing.

According to a further embodiment, the base section of the housing opening is formed by a ring-shaped bracket which is formed in one piece with the plastics housing, lies on the inside in the axial direction, and projects radially inward.

The bracket can form a stop for the jacket of the membrane pot. Thus, the arrangement position of the bracket can define how far the membrane pot can be inserted into the housing opening when the ultrasonic sensor is being mounted. Due to the fact that the bracket is ring-shaped, i.e. open in particular in a central region, it is nevertheless possible to use a decoupling wire or the like through the central opening of the bracket to bring the ultrasonic membrane of the membrane pot into contact with electronic components arranged on the other side of the bracket inside the plastics housing.

According to a further embodiment, at least one section of the decoupling element is arranged in an entire second overlap region, in which an end face of the jacket of the membrane pot and the base section of the housing opening overlap, and lies flat against the end face of the jacket of the membrane pot, wherein the ribs extending annularly in the radial direction are formed on the base section of the housing opening in the second overlap region.

Accordingly, in the entire second overlap region, in which the membrane pot (the end face of the jacket) and the base section of the housing opening (the surface of the ring-shaped bracket) overlap axially, the decoupling element can be arranged between them. In this case, the proposed acoustic decoupling is provided in that the ring-shaped or circumferential ribs are provided in the second overlap region and a bearing proportion of the base section (the bracket surface) is reduced. In addition, the decoupling element can have a damping effect due to the decoupling element resting flat, in particular fully, against the end face of the jacket of the membrane pot.

In particular, the jacket of the membrane pot can be widened at its end face facing the bracket, for example widened outwardly like a flange, in order to increase the size of the axial overlap region and to further improve the damping of axial vibrations.

According to a further embodiment, a ring-shaped lid is placed on the membrane pot and the plastics housing from the outside, covers exposed sections of the decoupling element, and is connected to the plastics housing from the outside, wherein the ring-shaped lid is a two-component material with a hard and a soft material component, and the soft material component rests against the outer surface of the jacket of the membrane pot, on the exposed sections of the decoupling element and on an end-face edge of the plastics housing.

The soft material component is at least softer than the hard material component. The soft material component can in particular be formed from the material from which the decoupling element is also formed, so for example from silicone. The hard material component can in particular be formed from the material from which the plastics housing is formed, so for example from plastic.

The lid (in particular the hard material component of the lid) can be connected to the plastics housing from the outside by laser welding, for example.

The lid can serve as a fastening element for fixing the membrane pot to the housing. The membrane pot is advantageously fixed to the housing in such a way that there is no direct contact between the membrane pot and the plastics housing at any point. There is also preferably no contact between the membrane pot and the hard material component of the lid at any point. The lid can rest against the membrane pot only by way of the soft material component. In this way it is possible to counteract a transfer of energy from the membrane pot via the lid to the plastics housing.

According to a second aspect, a motor vehicle with at least one ultrasonic sensor as described above is proposed.

The features, advantages and embodiments described for the ultrasonic sensor of the first aspect also apply correspondingly to the motor vehicle of the second aspect.

The motor vehicle can in particular be a passenger vehicle or a truck. The motor vehicle can have an assistance system, such as a driver assistance system or a parking assistance system for example, which can be set up in particular for semi-autonomous or fully autonomous driving of the vehicle. Semi-autonomous driving is understood to mean, for example, that the assistance system controls a steering apparatus and/or an automatic gear selection system. Fully autonomous driving is understood to mean, for example, that the assistance system additionally also controls a drive device and a braking device. The assistance system may be implemented in the form of hardware and/or in the form of software. In the case of an implementation in the form of hardware, the assistance system may be, for example, in the form of a computer or a microprocessor. In the case of an implementation in the form of software, the assistance system may be in the form of a computer program product, a function, a routine, part of a program code, or an executable object. In particular, the assistance system may be in the form of part of a superordinate control system of the vehicle, for example an ECU (Engine Control Unit). The assistance system can use the proposed ultrasonic sensor to monitor or measure a vicinity of the motor vehicle by means of ultrasonic measurements using the pulse-echo method.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is furthermore explained in more detail below on the basis of preferred exemplary embodiments with reference to the accompanying figures.

Identical or functionally identical elements have been provided with the same reference signs in the figures, unless stated otherwise.

Figure 1:
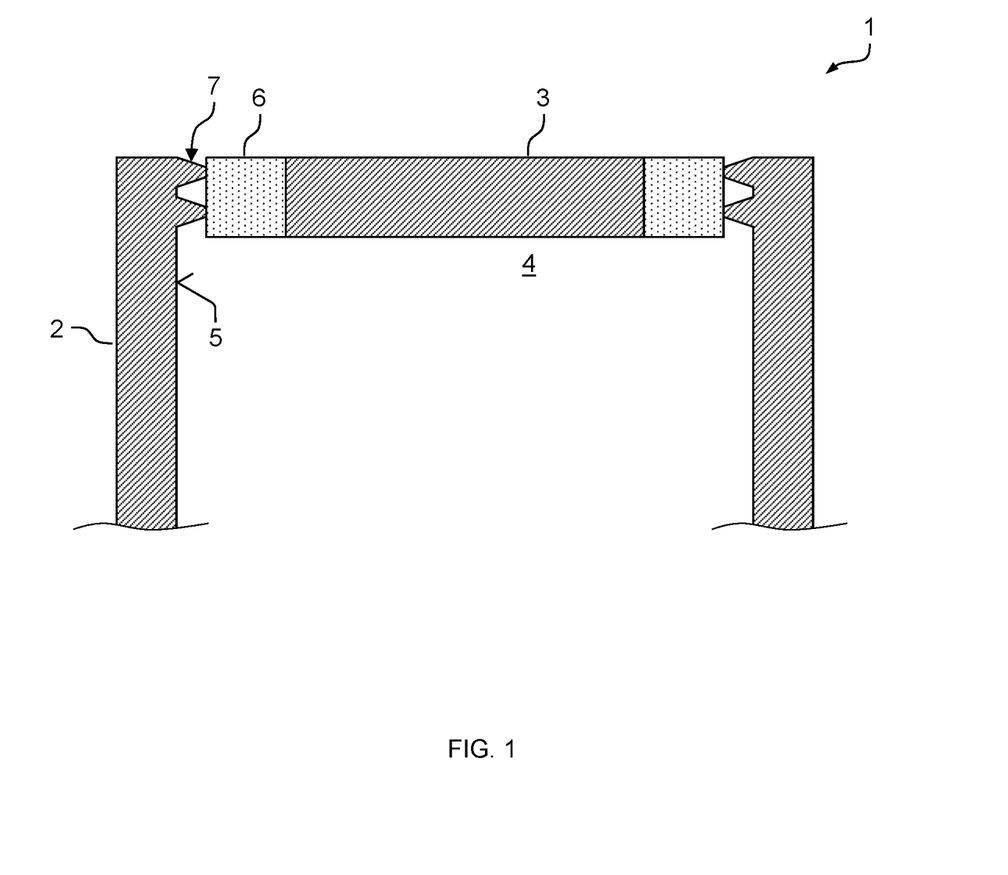
FIG. 1 shows a schematic vertical sectional view of an ultrasonic sensor according to a first exemplary embodiment.

FIG. 1 shows a schematic sectional view of an ultrasonic sensor 1 according to a first exemplary embodiment. The ultrasonic sensor has a plastics housing 2 and a membrane assembly 3. The membrane assembly is arranged in a housing opening 4 of the plastics housing 2 and includes in particular an ultrasonic membrane (not explicitly shown). A decoupling element 6 is arranged between an inner surface 5 of the plastics housing 2, which defines an edge of the housing opening 4, and the membrane assembly 3.

The decoupling element is made of a soft material such as silicone. In contrast, the plastics housing 2 is made of a hard material. The membrane assembly 3 is made, for example, from a material that is also hard, such as aluminum.

A plurality of ribs 7 are formed on the inner surface 5 of the plastics housing 2. The decoupling element 6 rests against the ribs 7. Accordingly, a bearing proportion of the inner surface 5 of the plastics housing (proportion of the inner surface 5 that is in contact with the decoupling element 6) is significantly lower than 100% and in particular reduced compared with a case in which the ribs 7 were not provided. That is to say, there is no full-area contact between the decoupling element 6 and the inner surface 5 of the plastics housing 2.

FIG. 1 shows only proposed aspects of the ultrasonic sensor 1. Of course, the ultrasonic sensor 1 can also have further elements that are not shown. For example, the membrane group 3 can further comprise a sound transducer element such as a piezo element or the like, which can be glued to the ultrasonic membrane of the membrane assembly 3 from the inside and is used to excite and detect vibrations of the ultrasonic membrane of the membrane assembly 3. The sound transducer element (not shown) can be electrically contacted with a decoupling wire (not shown). A printed circuit board with electronic components for controlling the sound transducer element and for communicating with a control unit external to the ultrasonic sensor 1 can further be provided in the housing 2 in a region that is not shown in FIG. 1.

In the ultrasonic sensor 1 shown in FIG. 1, the bearing proportion of the inner surface 5 of the plastics housing 2 is reduced, and the ribs 7 are formed on the side of the harder of the two elements (the plastics housing 2). Accordingly, the advantageously remains reduced even when the membrane assembly 3 is mounted under preloading in the housing opening 4. A particularly good acoustic decoupling between the membrane assembly 3 and the plastics housing 2 can thus advantageously be achieved and mounting can be made easier.

According to a preferred development of the first exemplary embodiment, which is shown in FIG. 1, a surface area of an outer surface of the membrane assembly that is in contact with the decoupling element 6 is not reduced. In other words, the decoupling element 6 rests flush or fully against the membrane assembly 3. Accordingly, vibrational energy of the membrane assembly 3 can advantageously be dissipated in the decoupling element 6 by internal friction, and the decoupling element 6 also has a damping function.

Figure 2:
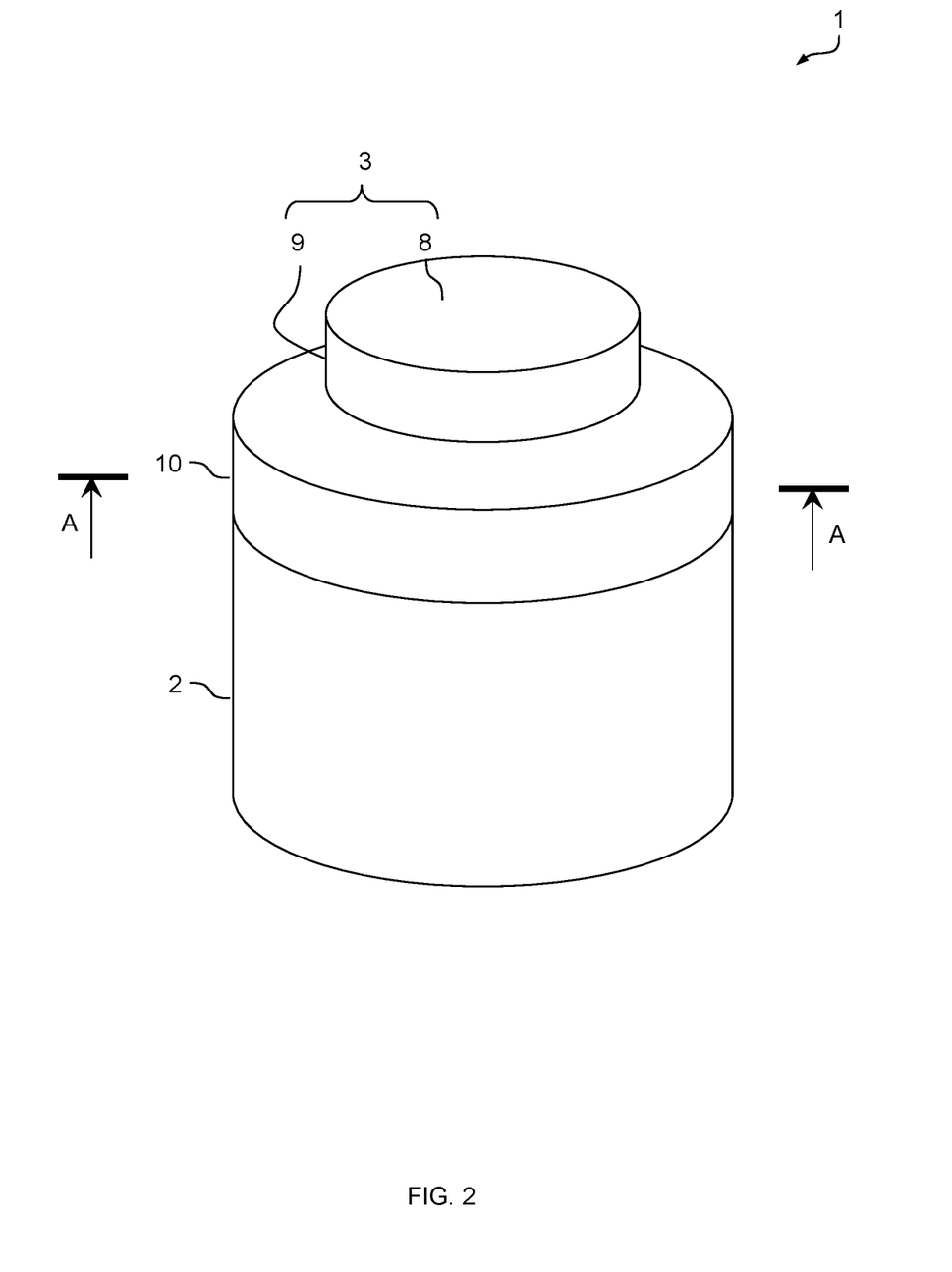
FIG. 2 shows a simplified view of an ultrasonic sensor according to a second exemplary embodiment.

FIG. 2 shows a simplified view of an ultrasonic sensor 1 according to a second exemplary embodiment. The following text describes mainly differences between the second exemplary embodiment and the first exemplary embodiment.

The ultrasonic sensor 1 has a plastics housing 2, in which the electronic components and the like, which were discussed above with reference to the first example and are not shown, are arranged. The membrane assembly of the ultrasonic sensor 1 is designed in the form of a membrane pot 3, which has a base 8 and a jacket 9 (jacket-type wall) and is hollow in its interior (not visible in FIG. 2). The membrane pot 3 consisting of the base 8 and the jacket 9 is formed in one piece as a deep-drawn component made of aluminum. The base 8 of the membrane pot 3 forms the ultrasonic membrane of the ultrasonic sensor 1 and is therefore also referred to as the ultrasonic membrane 8.

It can be seen in FIG. 2 that a section of the membrane pot 3 protrudes from the plastics housing 2. A ring-shaped lid 10 is placed on the membrane pot 3 and the plastics housing 2 from the outside and is connected to the plastics housing 2 from the outside. The part of the membrane pot 3 (of the jacket 9) that cannot be seen in FIG. 2 is arranged from the inside in a housing opening (4 in FIGS. 3, 4, 5) of the plastics housing 2 that cannot be seen in FIG. 2 either.

Figure 3:
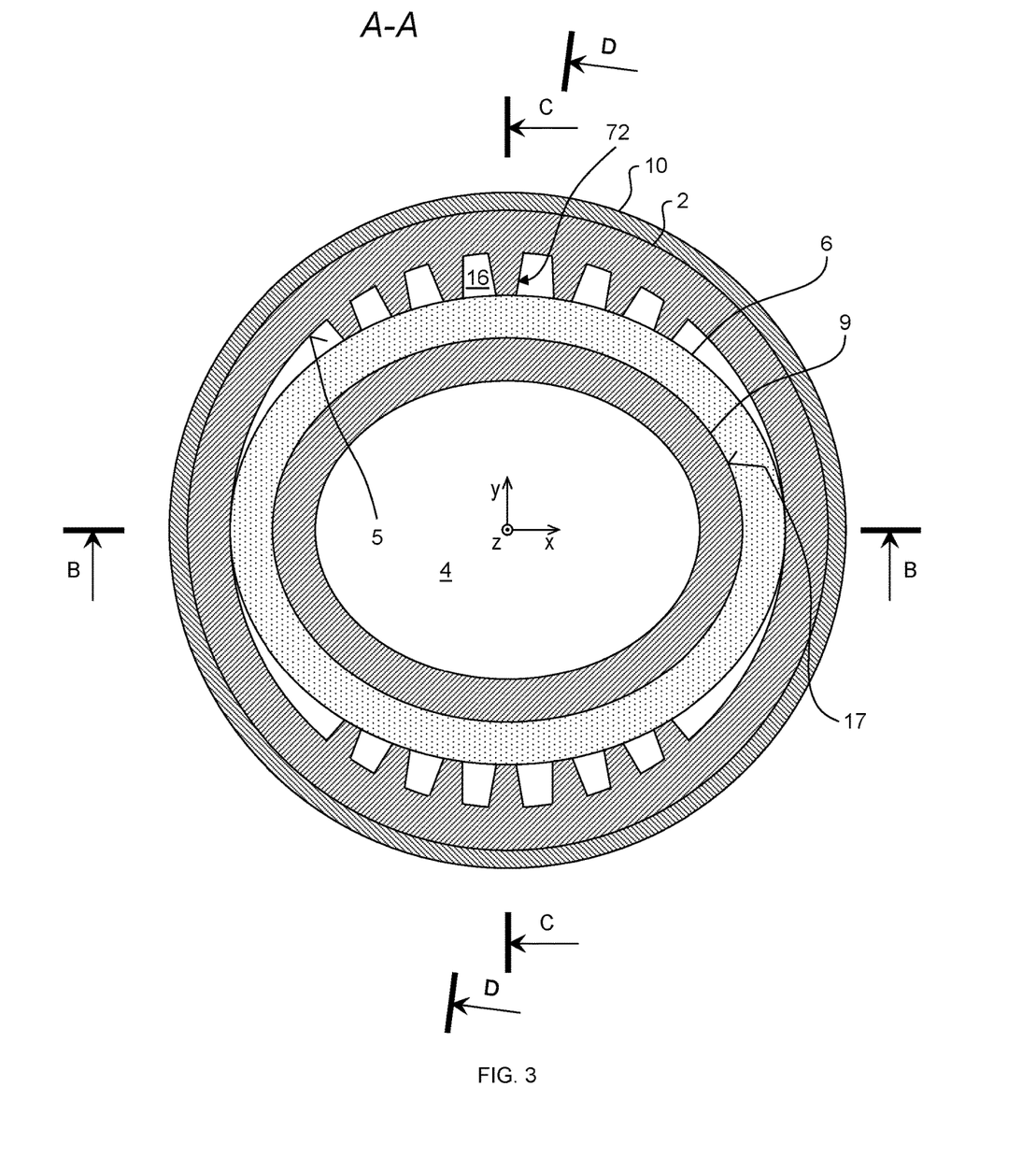
FIG. 3 shows a horizontal section A-A of the views in FIGS. 2, 4, 5 and 6.
Figure 4:
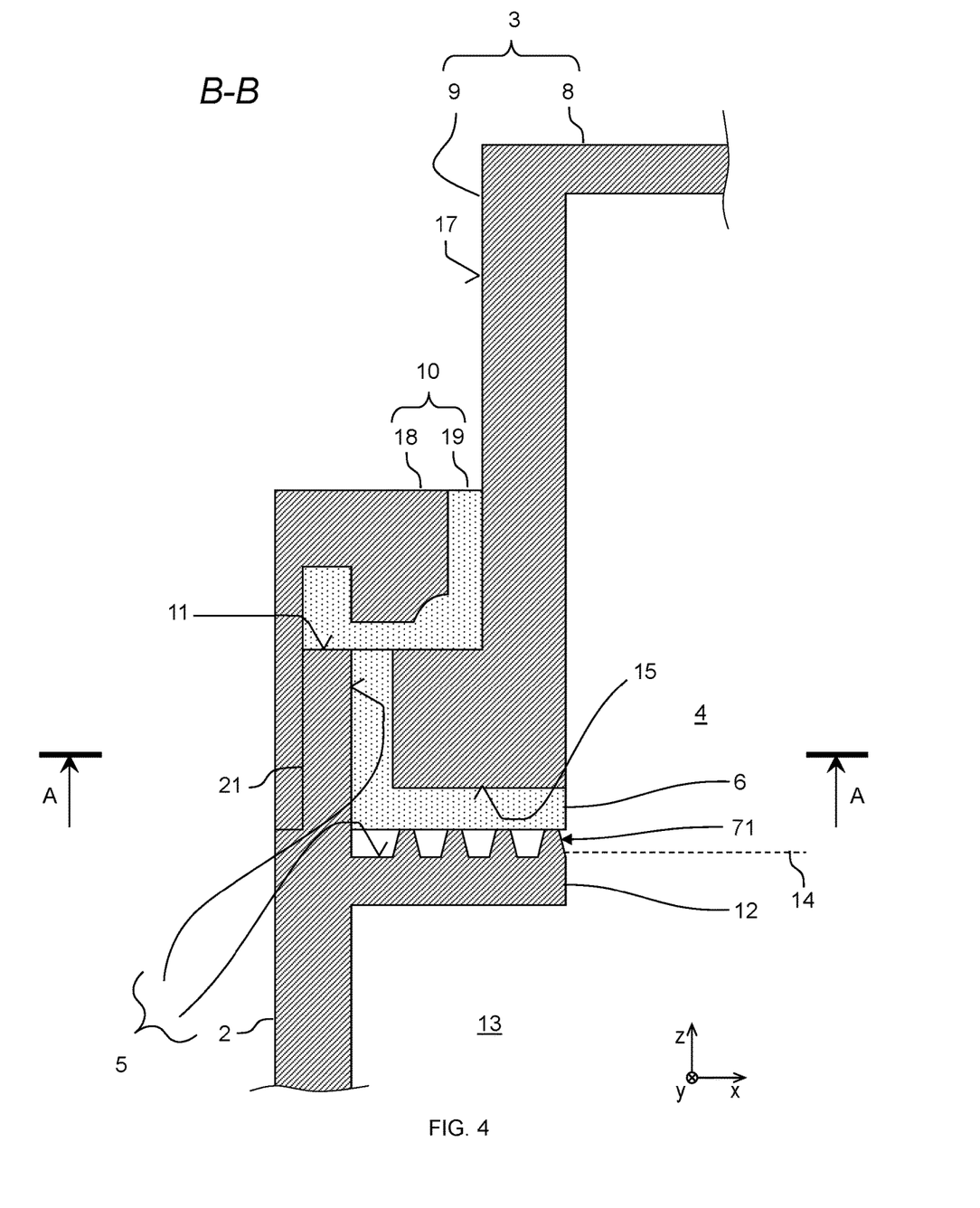
FIG. 4 shows a vertical section B-B of the view of FIG. 3.
Figure 5:
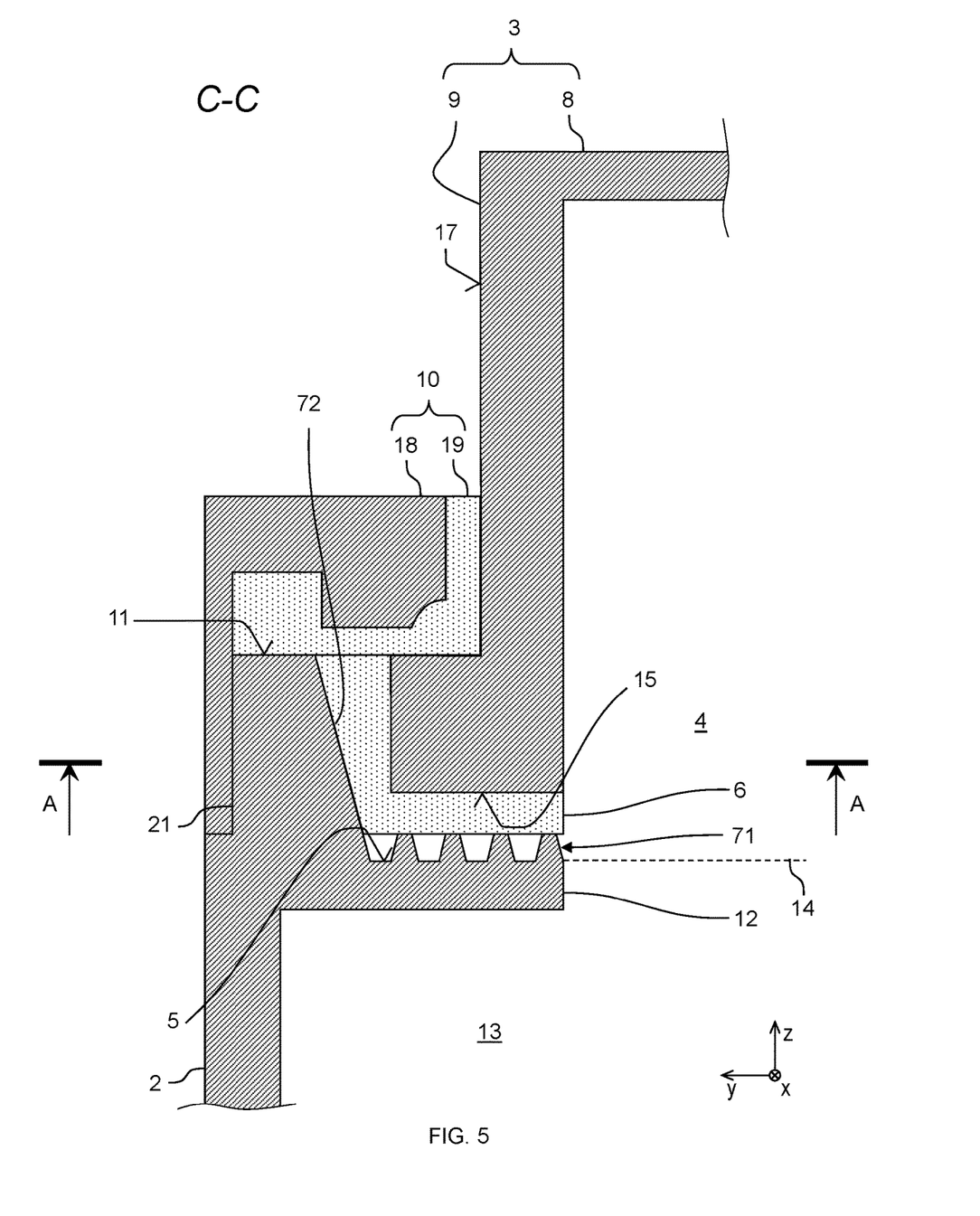
FIG. 5 shows a vertical section C-C of the view of FIG. 3.
Figure 6:
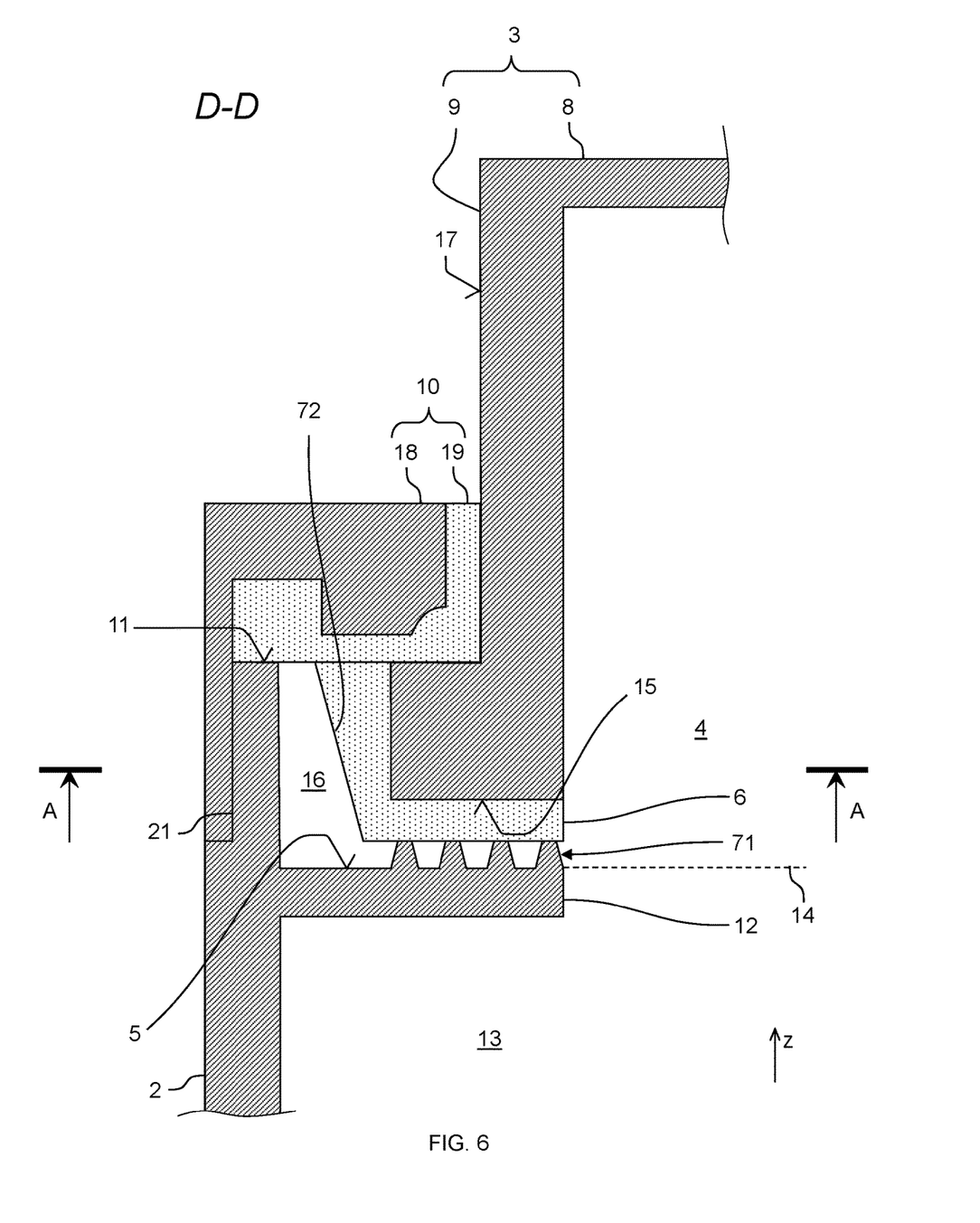
FIG. 6 shows a vertical section D-D of the view of FIG. 3.

An internal structure of a region of the ultrasonic sensor 1 in which the membrane pot 3 is inserted into the housing opening (4 in FIGS. 3, 4, 5) will now be described with reference to FIGS. 3-6. FIG. 3 shows a horizontal section A-A of the view of FIG. 2; FIG. 4 shows a vertical section B-B of the view of FIG. 3; FIG. 5 shows a vertical section C-C of the view of FIG. 3; and FIG. 6 shows a vertical section D-D of the view of FIG. 3. The directions x and y in FIGS. 3-5 describe a first (x) and a second (y) radial direction. Specifically, in FIG. 3, the arrows labeled x and y point radially outward. The z direction in FIGS. 3-5 denotes an axial direction (axial direction of the jacket 9 of the membrane pot 3 (FIG. 2) and axial direction of the housing opening 4 in the plastics housing 2). Specifically, the arrow labeled z points axially outward. The outward axial direction is also referred to as the "up" direction, and the inward axial direction is also referred to as the "down" direction. The terms "top" and "bottom", "above" and "below" refer to the drawing and are not intended to restrict the actual spatial orientation of the ultrasonic sensor 1 (FIG. 2) in any way.

Reference is made to FIGS. 4-6. The plastics housing 2 is open at the top and surrounds a substantially cylindrical inner housing opening 4, which extends axially inward or downward from a level of an upper or end-face edge 11 of the plastics housing 2. An axially inner section of the jacket 9 of the membrane pot 3 is arranged in the housing opening 4. In this case, a silicone ring 6 (example for a decoupling element) is arranged between the jacket section 9 and the inner surface 5 of the plastics housing 2.

A ring-shaped bracket 12 (FIGS. 4-6), which lies axially inside the housing opening 4 and protrudes radially inward from an outer wall of the plastics housing 2, forms a base section of the housing opening 4. A further base section 14 of the housing opening 4 is projected to extend through the open central region which is bordered by the ring-shaped bracket 10. The bracket 12 is formed in one piece with the plastics housing 2. The inner surface 5 of the plastics housing thus also comprises a surface of the bracket 12. Other components of the ultrasonic sensor 12, such as electronic components (not shown) for driving a piezo element (not shown) which is attached to the underside of the ultrasonic membrane 8, and the like are arranged in a housing interior 13 below the bracket 12. In other words, "housing opening 4" refers to an opening or recess in the plastics housing 2 that is specifically provided to receive at least one section of the membrane pot 3. However, the housing opening 4 does not necessarily encompass the entire interior 13 of the ultrasonic sensor 1.

As is shown in FIGS. 4-6, a plurality of first ribs 71 are arranged on the upper side of the bracket 12—and thus on an inner surface 5 of the plastics housing 2. The first ribs 71 protrude outward or upward in the axial direction of the housing opening 4 and extend annularly in a circumferential direction around the entire circumference of the housing opening 4. An end face 15 of the jacket 9 of the membrane pot 3 is widened in the form of a flange at its axially inner or lower end. A section of the silicone ring 6 is arranged between the end face 15 of the jacket and the bracket 12 in a region in which the end face 15 of the jacket 9 of the membrane pot 3 and the upper side of the bracket 12, which defines a base section of the housing opening 4, overlap. The first ribs 71 are also arranged in the same overlap region, on the inner surface of the plastics housing 5 in the region of the bracket 12. The silicone ring 6 (a horizontal section of the silicone ring 6) in this overlap region rests fully on the end face 15 of the jacket 9 of the membrane pot 3. Thus, the energy of axial vibrations of the membrane pot 3 can be transferred to the silicone ring 6 and dissipate there by way of internal friction. In contrast, due to the first ribs 71, which are arranged on the surface of the bracket 12 in the overlap region, a proportion of the inner surface 5 of the plastics housing which is in contact with the silicone ring 6 is reduced in the region of the bracket 12 compared with a case in which the first ribs 71 are not provided. In the case of axial structural vibrations of the membrane pot 3, the silicone ring 6 is thus alternately compressed and relaxed in the overlap region of the end face 15 of the jacket 9 and the inner surface 5 of the plastics housing 2 on the upper side of the bracket 12, and acoustic decoupling can be provided, i.e. the transfer of energy from the ultrasonic membrane 3 to the bracket 12 and thus to the plastics housing 2 can be reduced.

A further, vertical section of the silicone ring 6 is arranged in an overlap region between an outer surface 17 of the jacket 9 of the membrane pot 3 and a jacket section of the inner surface 5 of the plastics housing 2 in the region of a jacket 21, formed by the plastics housing 2, of the housing opening 4.

In particular, reference is made to section A-A in FIG. 3. In the overlap region between the outer surface 17 of the jacket 9 of the membrane pot 3 and the jacket section of the inner surface 5 of the plastics housing 2, the silicone ring 6 rests in full, continuous contact against the outer surface 17 of the jacket 9 of the membrane pot 3 (FIG. 4). Thus, the energy of radial vibrations of the membrane pot 3 can be transferred to the silicone ring 6 and dissipate there by way of internal friction. In contrast, a plurality of second ribs 72 are formed on the jacket section of the inner surface 5 of the plastics housing 2 and protrude radially inward. The contact between the silicone ring 6 and the plastics housing 2 is thus substantially reduced to the tips of the ribs 72; free cavities 16 in which there is no contact between the silicone ring 6 and the inner surface 5 of the plastics housing 2 are formed between the ribs 72. In the case of radial structural vibrations of the membrane pot 3, the silicone ring 6 is thus alternately compressed and relaxed in the overlap region of the outer surface 17 of the jacket 9 and the jacket section of the inner surface 5 of the plastics housing 2, and acoustic decoupling can be provided, i.e. the transfer of energy from the ultrasonic membrane 3 to the plastics housing 2 can be reduced.

In the section C-C shown in FIG. 5, it can be seen that the second rib 72 shown there extends in the axial direction over the entire overlap region of the outer surface (17 in FIG. 3) of the jacket 9 of the membrane pot 3 with the jacket section of the inner surface 5 of the plastics housing 2 in the region of the jacket 21. It can also be seen in FIG. 5 that the axially extending rib 72 forms an insertion bevel. The insertion bevel can serve to make the insertion of the membrane pot 3 with the silicone ring 6 attached thereto into the housing opening 4 easier. In particular, if the membrane pot 3 is mounted under a defined preload, the desired position of the membrane pot 3 can also be predefined by the insertion bevel.

In the section D-D shown in FIG. 6, a cavity 16 between two of the second ribs (72 in FIGS. 3, 5) can be seen by way of example. In other words, in sections between two second ribs (72 in FIGS. 3, 5) there is no contact between the silicone ring 6 and the jacket section of the inner surface 5 of the plastics housing 2 in the region of the jacket 21.

With further reference to FIGS. 4-6, a ring-shaped lid 10 is placed on the membrane pot 3 and the plastics housing 2 from the outside. The ring-shaped lid 10 is a two-component material with a hard component 18 and a soft component 19. The hard component 18 of the lid 10 is laser-welded to the wall 15 of the plastics housing 2 from the outside. The soft component 19 of the lid rests against the end-face edge 11 of the plastics housing 2 (the jacket 21), against the silicone ring 6 and against the outer surface 17 of the jacket 9 of the membrane assembly 3 and covers them. The lid is used to fix and seal the connection between the membrane pot 3 and the plastics housing 2. In this case, only the soft component 19 of the lid 10 rests against these components, namely the membrane pot 3 and the silicone ring 6, which are permitted structural vibrations according to the proposed structure. The soft component 19 of the lid 10 can likewise be silicone. Accordingly, hardly any vibrational energy is transferred to the plastics housing 2 through the lid 10.

Figure 7:
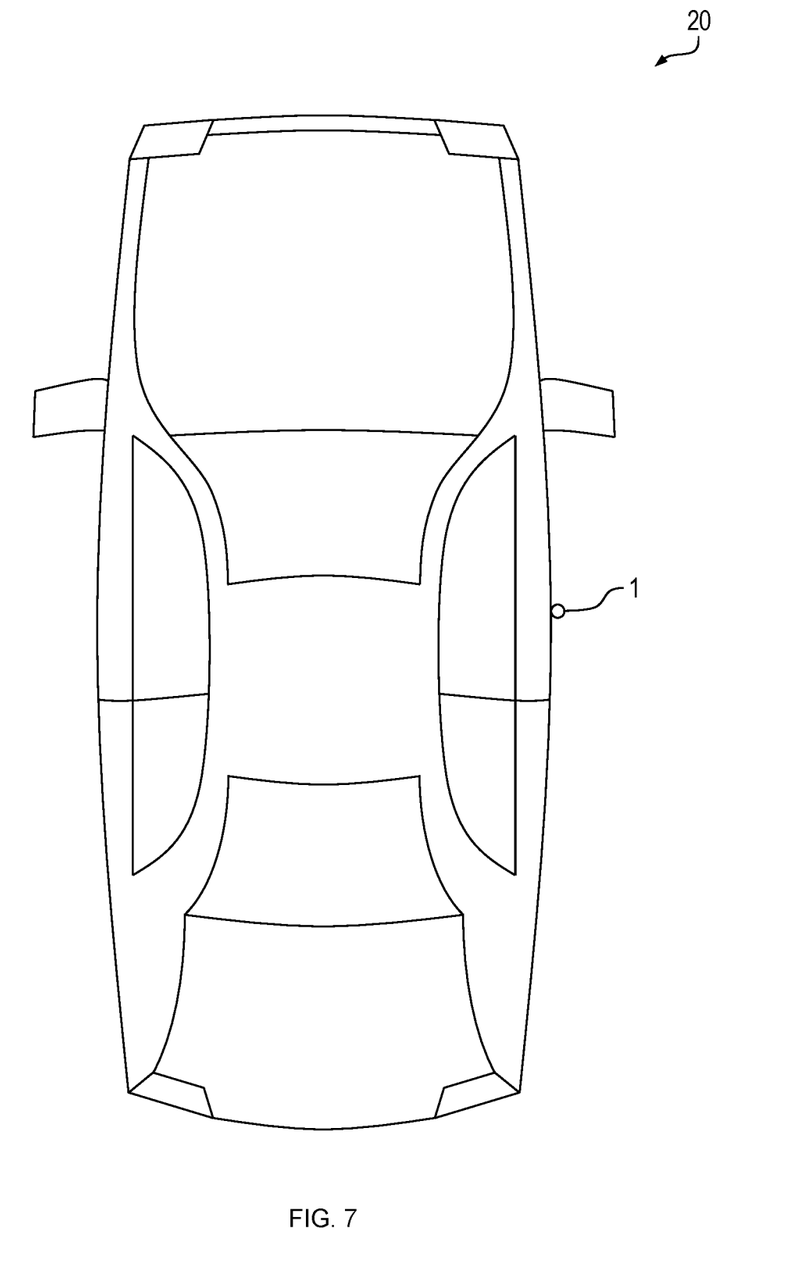
FIG. 7 shows a motor vehicle according to a third exemplary embodiment.

FIG. 7 shows a schematic top view of a motor vehicle 20 according to a third exemplary embodiment. The motor vehicle has an ultrasonic sensor 1, which can be an ultrasonic sensor according to the first or the second exemplary embodiment. The ultrasonic sensor 1 is installed on the side of the motor vehicle 20 and is used by a control unit (not shown) of the motor vehicle 20 which forms a parking assistance system in order to measure a lateral vicinity of the motor vehicle.

Although the present invention has been described on the basis of exemplary embodiments, it may be modified in many ways.

Thus, an anisotropic structure is shown in FIG. 3, in which the second ribs 72 are arranged only in a region which substantially extends in the second radial direction y. The jacket 9 of the membrane pot 3 is elliptical, and accordingly the ultrasonic membrane 8 is also elliptical. The structure shown in FIG. 3 is substantially configured to dampen and acoustically decouple radial vibrations of the membrane pot 3 in the second radial direction y. The structure shown in FIG. 3 is specifically matched to the radiation pattern of a specific ultrasonic membrane 8. However, it is of course also conceivable to provide the ribs 72 on other sections or even along the entire circumference of the inner wall 5 of the plastics housing 2 if other or any radial vibrations are to be decoupled in the first and/or the second radial direction or in any linear combinations thereof.

The arrangement of the ultrasonic sensor 1 on the motor vehicle 20 shown in FIG. 7 is purely exemplary. It goes without saying that in practical exemplary embodiments a large number of proposed ultrasonic sensors 1 can be arranged around an outer skin of the vehicle 20 in order to be able to reliably monitor the entire vicinity of the motor vehicle 20.

Structures of an ultrasonic sensor 1 were described on the basis of the exemplary embodiments, in which a particularly good acoustic decoupling between the membrane assembly 3 and the plastics housing 2 is provided owing to a reduced proportion of an inner surface 5 of the plastics housing 2 which is in contact with a side of the decoupling element 6 facing away from the membrane assembly 3. As a result, the acoustic decoupling has been moved further outward, i.e. away from the membrane pot 3, compared with comparative examples in which no ribs are formed in the plastics housing or ribs are formed only on the decoupling element 6. The membrane assembly 3 can also be mounted under preloading while maintaining the reduced bearing proportion. There is a clearly defined separation of the technical effect of acoustic decoupling (on the outer surface of the decoupling element 6) on the one hand and the technical effect of acoustic damping (inside the decoupling element 6) on the other. The proposed ultrasonic sensors 1 can accordingly exhibit improved structural dynamics.

LIST OF REFERENCE SIGNS

1 Ultrasonic sensor
2 Plastics housing
3 Membrane assembly, membrane pot
4 Housing opening
5 Inner surface of the housing opening
6 Decoupling element, silicone ring
7 Ribs
8 Base, ultrasonic membrane
9 Jacket
10 Ring-shaped lid
11 End-face edge of the plastics housing
12 Bracket, base section of the housing opening
13 Housing interior
14 Further base section of the housing opening
15 End face of the jacket of the membrane pot
16 Cavity
17 Outer surface of the jacket of the membrane pot
18 Hard component
19 Soft component
20 Motor vehicle
21 Jacket of the housing opening
71 First ribs
72 Second ribs

The invention claimed is:

1. An ultrasonic sensor for a motor vehicle, comprising:
a plastics housing;
a membrane assembly arranged in a housing opening of the plastics housing;
an ultrasonic membrane; and
a decoupling element arranged between an inner surface of the plastics housing and the membrane assembly,
wherein a plurality of ribs against which the decoupling element rests are formed on the inner surface of the plastics housing, wherein the ribs are formed such that the decoupling element does not rest fully against the inner surface of the plastics housing,
wherein a plurality of first ribs project in the axial direction of the housing opening and extend annularly in a circumferential direction of the housing opening, and
wherein a plurality of second ribs project radially inward and extend in the axial direction of the housing opening.

2. The ultrasonic sensor as claimed in claim 1, wherein the decoupling element rests fully against the membrane assembly.

3. The ultrasonic sensor as claimed in claim 1, wherein the membrane assembly is mounted under preloading in the housing opening.

4. The ultrasonic sensor as claimed in claim 1, wherein the membrane assembly comprises a membrane pot with a base forming the ultrasonic membrane, and a jacket formed in one piece with the base, wherein the membrane pot is inserted into the housing opening along an axial direction of the housing opening.

5. The ultrasonic sensor as claimed in claim 4, wherein the plurality of second ribs are formed on a jacket section of the inner surface of the plastics housing.

6. The ultrasonic sensor as claimed in claim 4, wherein at least one section of the decoupling element is arranged in an entire first overlap region, in which an outer surface of the jacket of the membrane pot and the jacket section of the inner surface of the plastics housing overlap, lies flat against the jacket of the membrane pot, and annularly encloses the jacket of the membrane pot, wherein the plurality of second ribs extending in the axial direction are formed in the jacket section of the inner surface of the plastics housing in the first overlap region.

7. The ultrasonic sensor as claimed in claim 6, wherein the plurality of second ribs extending in the axial direction form an insertion bevel for inserting the membrane pot and the decoupling element.

8. The ultrasonic sensor as claimed in claim 4, wherein the plurality of first ribs are formed on a base portion of the housing opening.

9. The ultrasonic sensor as claimed in claim 8, wherein the base portion of the housing opening is formed by a ring-shaped bracket which is formed in one piece with the plastics housing, lies on the inside in the axial direction, and projects radially inward.

10. The ultrasonic sensor as claimed in 8, wherein at least one section of the decoupling element is arranged in an entire second overlap region, in which an end face of the jacket of the membrane pot and the base section of the housing opening overlap, and lies flat against the end face of the jacket of the membrane pot, wherein the plurality of first ribs are formed on the base section of the housing opening in the second overlap region.

11. The ultrasonic sensor as claimed in claim 4, wherein a ring-shaped lid is placed on the membrane pot and the plastics housing from the outside, covers exposed sections of the decoupling element, and is connected to the plastics housing from the outside, and wherein the ring-shaped lid is a two-component material with a hard material component and a soft material component, and the soft material component rests against the outer surface of the jacket of the membrane pot, against the exposed sections of the decoupling element, and against an end-face edge of the plastics housing.

12. A motor vehicle with at least one ultrasonic sensor as claimed in claim 1.

13. The ultrasonic sensor as claimed in claim 1, wherein an amount by which the plurality of second ribs project radially inward increases from an axially inward position to an axially outward position.

14. The ultrasonic sensor as claimed in claim 1, wherein a plurality of free cavities are formed between the plurality of second ribs, such that there is no contact between the decoupling element and the inner surface of the plastics housing.

* * * * *